April 29, 1952     R. R. BURKHALTER     2,595,209
SHIFTABLE GEAR MOUNTING

Filed Oct. 4, 1946     2 SHEETS—SHEET 1

INVENTOR:
Robert R. Burkhalter,
BY
Bodell & Thompson
ATTORNEYS.

Patented Apr. 29, 1952

2,595,209

UNITED STATES PATENT OFFICE 2,595,209

SHIFTABLE GEAR MOUNTING

Robert R. Burkhalter, Toledo, Ohio

Application October 4, 1946, Serial No. 701,114

2 Claims. (Cl. 287—52.05)

This invention relates to shiftable gears, and has for its object a simple mounting for preventing gear hopping, that is, the shifting out of mesh or walking out of the gear under the reaction of the gear, when in operation. In gear shifting mechanisms, such as are used in the automotive field, the shiftable gear tends to shift out of mesh, the usual poppets acting on the shift rods to hold the gears in shifted position not being sufficient under all conditions to hold the gears in mesh or prevent them from hopping or walking out. One especially bad situation is in the reverse spool with great gear reduction and the invention is shown as embodied in a reverse gear mechanism, although it is applicable in any other shift or clutch gear assembly.

The invention consists in the novel features and in the combinations and constructions hereinafter set forth and claimed.

In describing this invention, reference is had to the accompanying drawings, in which like characters designate corresponding parts in all the views.

The invention consists in a toothed element of a transmission mechanism shiftable into and out of mesh with another alined toothed element, which shiftable element is slidably mounted on a shaft, the portion thereof on which the shiftable element is arranged, when in engaged position, being of slightly less diameter than that portion on which the shiftable element is, at least partly located, when out of engaged position, thereby providing a minute annular shoulder between the two shaft portions of different diameters, the portion of smaller diameter permitting the shiftable element to move slightly in response to radial thrust and abut against the shoulder, when engaged with the other element.

In the illustrated embodiment of my invention, the shiftable element is shown as a gear shiftable into and out of mesh with another gear.

Figure 1:
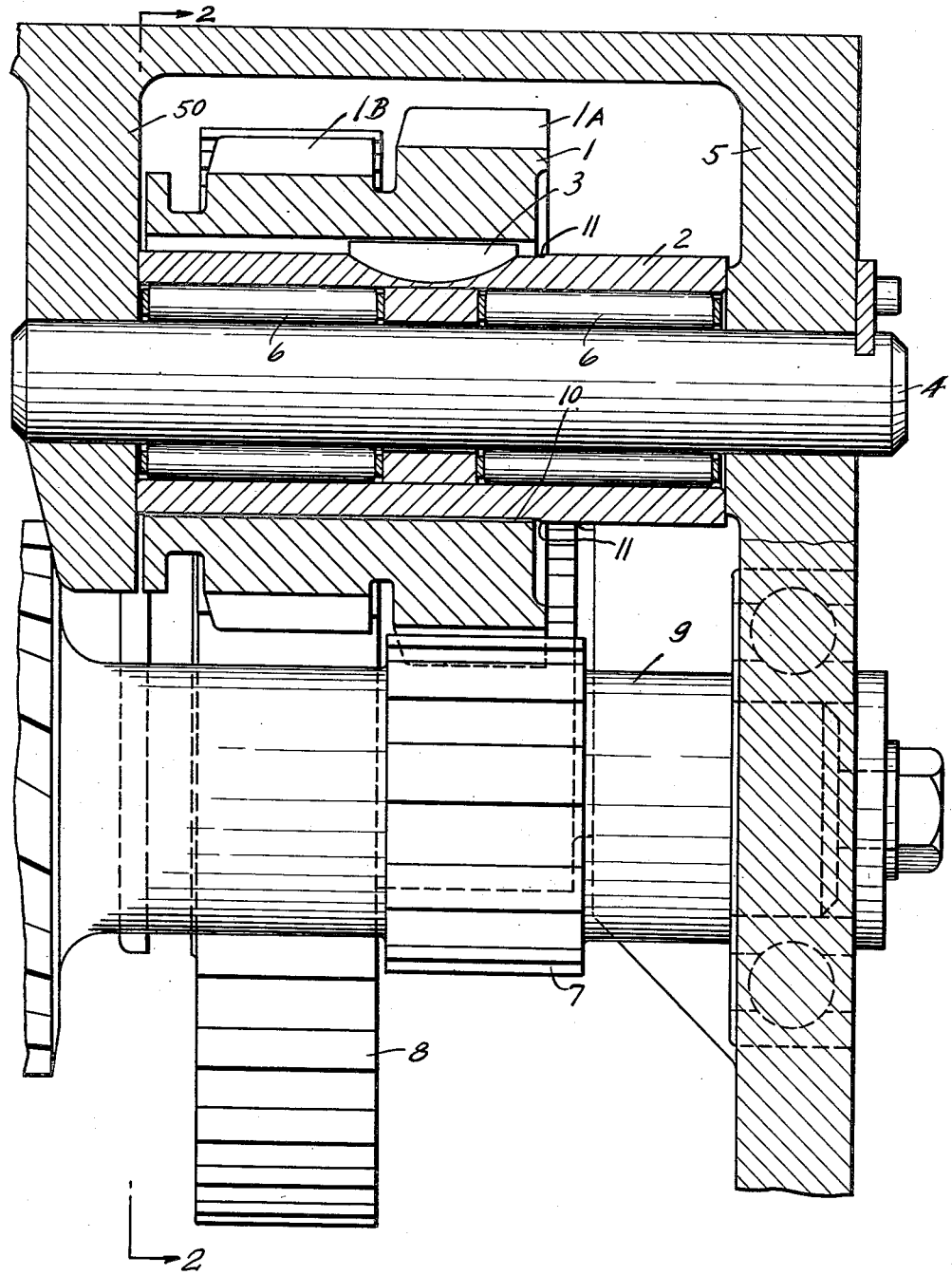
Figure 1 is an enlarged fragmentary sectional view of a reverse gear idler embodying this invention and contiguous parts of a transmission gear, as the countershaft and the transmission shaft having gears thereon with which the gears of the gear spool are shiftable to produce reverse speed.
Figure 2:
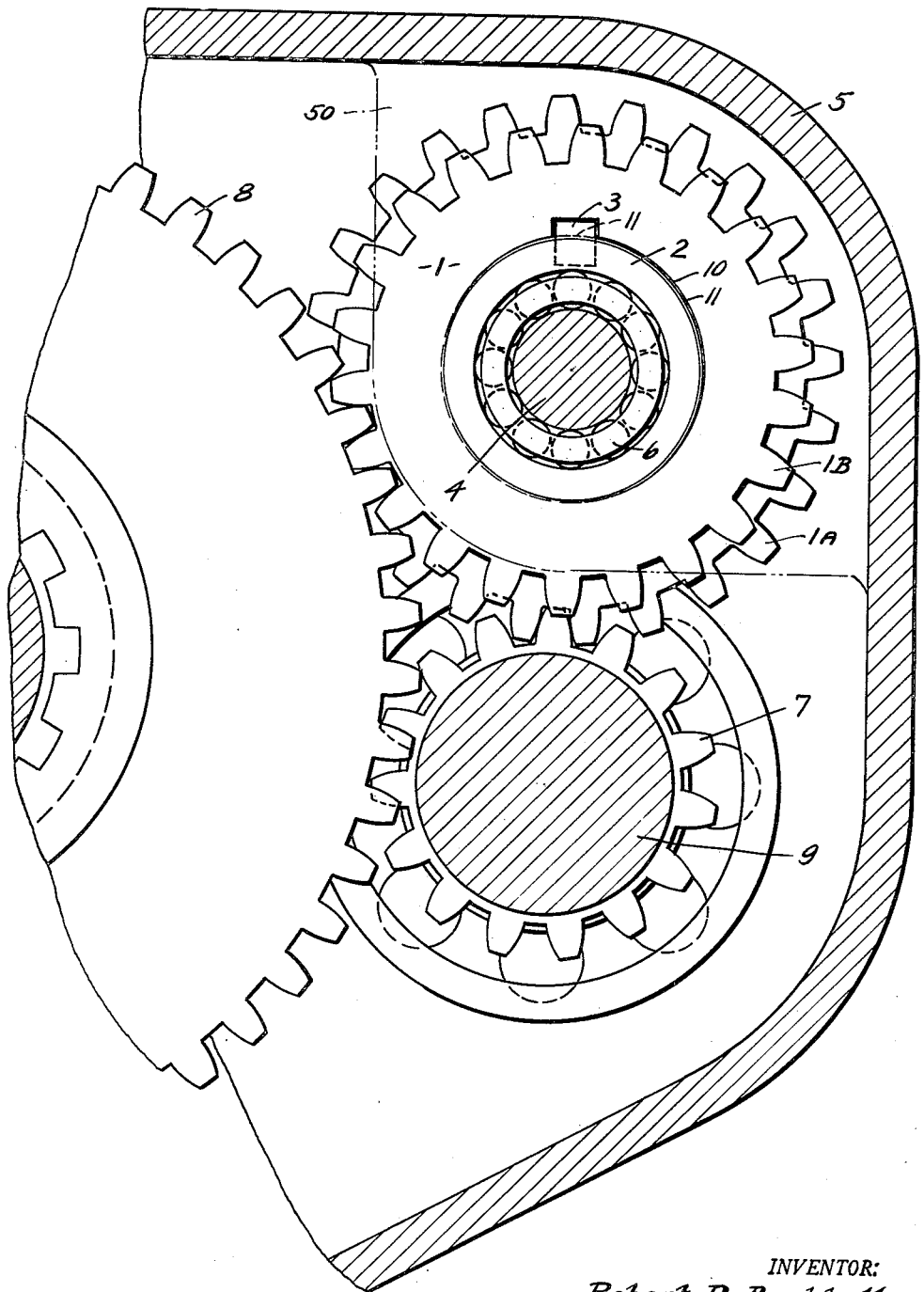
Figure 2 is a sectional view taken on the plane of line 2—2, Figure 1.

1 designates a shiftable gear, as, in the illustrated embodiment of the invention, the spool of a reverse gearing, this being mounted on a spindle or sleeve 2 and keyed at 3 thereto. The spindle or sleeve 2 is shown as mounted to rotate about a shaft or spindle 4. The spindle 4 is suitably mounted in a support, as a bracket 50 in the gear box 5. Antifriction bearings 6 are interposed between the shaft or spindle 4 and the spindle or sleeve 2. The sleeve or spindle 2 abuts at its ends against the end walls 50 of the bracket and box 5. The spindle may be any other form of shaft, smooth or splined. The shiftable gear is normally arranged out of mesh with companion gears 7 and 8 mounted on different shafts of the transmission, as the countershaft 9 and the transmission shaft. The gears 7 and 8 thus mesh with the shiftable gear 1, which is here illustrated as a spool gear, on the same side of the axis of the shiftable gear or thrust radially in the same general direction to the axis of the spool 8. Thus, the gear spool has a radial thrust thereon. In Figure 1, the shiftable gear 1 is shown in shifted position. In its normal position, it is located to the right with the gear teeth 1A and 1B out of mesh respectively with the gears 7 and 8.

In order to positively prevent the walking of the gear 1 out of mesh with the gears 7 and 8, the portion of the spindle 2 occupied by the gear spool, when the gear spool is in shifted position, is formed of slightly less diameter than the remaining portion and than the bore 10 of the shiftable gear, thus providing an annular shoulder 11 against which the end of the gear 1 around its bore abuts when the shiftable gear is in shifted position, the radial thrust on the gear 1 tending to cause it to interlock against axial shift with the shoulder 11. The shoulder 11 is minute and the amount of radial movement is inconsequential, in so far as the rotation of the gear is concerned. The amount is, however, sufficient to provide an interlock to outward axial shifting of the gear spool under the load but to permit the outward axial shift when the load is released preliminary to again shifting out by the releasing of the engine clutch.

In most instances, it is necessary to provide against walking out in one direction only by providing one shoulder but another shoulder may be provided to prevent walking out in opposite directions.

By this shiftable gear mounting and the arrangement of the minute annular shoulder, prevention of walking out of the gear spool is accomplished without any additional parts or mechanism.

What I claim is:

1. A power transmission mechanism including a housing, an auxiliary shaft mounted in the housing, a sleeve rotatably mounted on the shaft, a gear slidably carried by the sleeve and keyed thereto to rotate therewith, the gear when in one position on the sleeve adapted to be in driving connection with another gear in the housing, the sleeve having one part of slightly smaller diameter than the other part thus providing a shoulder at the point of change from the smaller diameter to the larger diameter, the gear being on the smaller diameter part when in driving connection and when load is applied thereto is moved radially with respect to said sleeve so that the gear will engage the shoulder and will be prevented from becoming disengaged from its driving connection.

2. A power transmission mechanism including a housing, a shaft mounted in the housing, a gear slidable on and rotatable with respect to said shaft, the gear when in one position on the shaft adapted to be in driving connection with another gear in the housing, the shaft having one part of slightly smaller diameter than the other part thus providing a shoulder at the point of change from the smaller diameter to the larger diameter, the gear being on the smaller diameter part when in driving connection and when load is applied thereto is moved radially with respect to said shaft so that the gear will engage the shoulder and will be prevented from becoming disengaged from its driving connection.

ROBERT R. BURKHALTER.

REFERENCES CITED

The following references are of record in the file of this patent:

UNITED STATES PATENTS

| Number | Name | Date |
|---|---|---|
| 1,379,214 | Richards | May 24, 1921 |
| 1,795,460 | Whitney | Mar. 10, 1931 |
| 2,440,775 | Land | May 4, 1948 |

FOREIGN PATENTS

| Number | Country | Date |
|---|---|---|
| 403,943 | Great Britain | Dec. 22, 1933 |
| 705,137 | Germany | Apr. 21, 1941 |